US012810831B2

(12) United States Patent
Yamaguchi

(10) Patent No.: US 12,810,831 B2
(45) Date of Patent: Nov. 24, 2026

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 917 days.

(21) Appl. No.: 18/188,328

(22) Filed: Mar. 22, 2023

(65) Prior Publication Data

US 2023/0317040 A1 Oct. 5, 2023

(30) Foreign Application Priority Data

Mar. 30, 2022 (JP) ................................ 2022-056840

(51) Int. Cl.
*G10H 1/34* (2006.01)

(52) U.S. Cl.
CPC ....... *G10H 1/346* (2013.01); *G10H 2220/221* (2013.01); *G10H 2220/265* (2013.01)

(58) Field of Classification Search
CPC ............. G10H 1/346; G10H 2220/221; G10H 2220/265
See application file for complete search history.

(56) References Cited

U.S. PATENT DOCUMENTS

2013/0180390 A1* 7/2013 Ishida .................... G10H 1/346 84/745
2014/0000437 A1 1/2014 Osuga et al.
2015/0114202 A1* 4/2015 Suzuki .................... G10C 3/18 84/236

(Continued)

FOREIGN PATENT DOCUMENTS

JP 2009-075404 A 4/2009
JP 2014-10374 A 1/2014
JP 2022-47578 A 3/2022

OTHER PUBLICATIONS

Japanese Office Action dated Sep. 8, 2025 for corresponding Japanese Patent Application No. 2022-056840 (11 pages) with English Translation (12 pages).

*Primary Examiner* — Jianchun Qin
(74) *Attorney, Agent, or Firm* — WOMBLE BOND DICKINSON US LLP

(57) ABSTRACT

A keyboard device for a keyboard instrument, capable of causing a cushion to properly function while suppressing generation of noise when a hammer contacts the cushion. The hammer is vertically pivotally moved in a manner interlocked with key depression. The cushion is provided below the hammer. In a key-released state, a contact portion of the hammer is placed on the cushion, and when the hammer pivotally moved upward by key depression returns to its original position by key release, the contact portion contacts the cushion from above. The contact portion is formed to be inclined in the front or rear direction with respect to the upper surface of the cushion when contacting the cushion. The hammer has a deformation suppressing portion provided on the contact portion and/or its vicinity, for suppressing deformation of the cushion in the front-rear direction when contacting the cushion.

3 Claims, 10 Drawing Sheets

(56) References Cited

U.S. PATENT DOCUMENTS

| | | | | |
|---|---|---|---|---|
| 2018/0277082 | A1* | 9/2018 | Suzuki | G10H 1/346 |
| 2020/0074968 | A1* | 3/2020 | Suzuki | G10H 1/346 |
| 2022/0084484 | A1 | 3/2022 | Suzuki | |

* cited by examiner

KEYBOARD DEVICE FOR KEYBOARD INSTRUMENT

CROSS-REFERENCE TO RELATED APPLICATION

This application claims priority to Japanese Patent Application Number 2022-056840, filed on Mar. 30, 2022, the entire content of which is incorporated herein by reference.

BACKGROUND OF THE INVENTION

Field of the Invention

The present invention relates to a keyboard device which is applied to a keyboard instrument, such as an electronic piano, and includes a hammer pivotally moved in a manner interlocked with key depression.

Description of the Related Art

Conventionally, as this type of a keyboard device, there has been known, for example, one disclosed in Japanese Laid-Open Patent Publication (Kokai) No. 2014-10374. In this keyboard device, hammers are pivotally movably provided below keys extending in a front-rear direction, on a key-by-key basis. In a key-released state, each hammer extends in the front-rear direction in a state inclined downward toward the rear such that a rear end thereof contacts a stopper from above. This stopper is formed by a stopper rail horizontally extending in a left-right direction, and a buffer formed on an upper surface of the stopper rail and having a predetermined rectangular shape in transverse cross-section over the entire longitudinal length thereof.

In the keyboard device including the stopper described above, when one of the keys is depressed, a hammer associated with the key is pivotally moved in a predetermined direction, and a rear end of the hammer moves upward from the stopper. Then, when the key is released, the hammer is pivotally moved in a direction opposite to the above-mentioned direction, and the rear end of the hammer moves into contact with the stopper from above.

In the keyboard device including the above-described hammers and stopper, when one of the hammers contacts the stopper, the contact of a contact portion of the hammer onto the buffer of the stopper from immediately above, the buffer having the rectangular shape in transverse cross-section is deformed only in a vertical direction, so that the buffer can properly exert its function as a buffer. However, if the contact portion of the hammer has a large contact area at a moment when the contact portion of the hammer contacts the buffer, noise is liable to be generated. To avoid this, it is envisaged, for example, that an upper surface of the buffer is formed to extend horizontally, and the contact portion of the hammer is formed such that the contact portion is inclined with respect to the horizontal upper surface, whereby the contact area is prevented from being large at the moment when the contact portion of the hammer contacts the buffer.

However, in the case where the upper surface of the buffer and the contact portion of the hammer are formed as described above, when the contact portion of the hammer contacts the buffer, not only a downward force but also a force in the front-rear direction acts on the buffer from the contact portion of the hammer. As a consequence, there is a fear that the buffer is liable to be deformed in the front-rear direction, causing the buffer to be hindered from sufficiently exerting its function as a buffer.

SUMMARY OF THE INVENTION

It is an object of the present invention to provide a keyboard device for a keyboard instrument, which is capable of causing a cushion to properly exert its function as a cushion while suppressing generation of noise when a hammer contacts the cushion.

To attain the above object, the present invention provides a keyboard device for a keyboard instrument, including a keyboard chassis, a key extending in a front-rear direction and disposed on the keyboard chassis, a hammer extending in the front-rear direction and being pivotally supported, below the key, on the keyboard chassis, via a hammer support shaft, the hammer being vertically pivotally moved in a manner interlocked with the key which has been depressed, and a cushion provided below the hammer and having a predetermined portion of the hammer placed thereon in a key-released state, the predetermined portion of the hammer contacting the cushion from above when the hammer having been pivotally moved upward in accordance with depression of the key returns to an original position in accordance with release of the key, wherein the predetermined portion of the hammer is formed such that the predetermined portion is inclined downward toward one side in the front-rear direction with respect to an upper surface of the cushion when the predetermined portion contacts the cushion, and wherein the hammer has a deformation suppressing portion provided on the predetermined portion and/or its vicinity, for suppressing deformation of the cushion in the front-rear direction when the hammer contacts the cushion.

With this construction, when the hammer having been pivotally moved upward in accordance with depression of the key returns to its original position in accordance with release of the key, the predetermined portion of the hammer contacts the cushion from above. In this case, since the predetermined portion of the hammer is formed such that the predetermined portion is inclined downward toward one side in the front-rear direction with respect to the upper surface of the cushion, the predetermined portion of the hammer progressively contacts the upper surface of the cushion from one end toward the other end thereof in the front-rear direction. With this, it is possible to suppress generation of noise when the hammer contacts the cushion. Further, when the above-mentioned predetermined portion of the hammer contacts the cushion, not only a downward force but also a force in the front-rear direction sometimes acts on the cushion. In view of this, the hammer has the deformation suppressing portion provided on the predetermined portion and/or its vicinity, and therefore, this deformation suppressing portion suppresses deformation of the cushion in the front-rear direction, thereby making it possible to cause the cushion to properly exert its function as a cushion.

Preferably, the predetermined portion of the hammer is formed such that the predetermined portion is inclined downward toward a rear with respect to the upper surface of the cushion when the predetermined portion contacts the cushion, and the deformation suppressing portion includes a downwardly protruding front-side protrusion on a front side of the predetermined portion.

With the construction of this preferred embodiment, the predetermined portion of the hammer is formed such that the predetermined portion is inclined downward toward the rear with respect to the upper surface of the cushion when the hammer contacts the cushion. Therefore, when the predetermined portion of the hammer contacts the cushion, the predetermined portion progressively contacts the cushion from a rear end toward a front end of the cushion. In this case, although not only a downward force but also a force from the rear to the front acts on the cushion by the predetermined portion of the hammer, since the downwardly protruding front-side protrusion is formed on the front side of the predetermined portion of the hammer, it is possible to effectively suppress forward deformation of the cushion.

More preferably, the deformation suppressing portion further includes a downwardly protruding rear-side protrusion on a rear side of the predetermined portion.

With the construction of this preferred embodiment, the downwardly protruding rear-side protrusion is provided on the rear side of the predetermined portion of the hammer, and therefore when the predetermined portion of the hammer contacts the cushion, it is possible to more effectively suppress deformation of the cushion in the front-rear direction by cooperation of the downwardly protruding rear-side protrusion and the front-side protrusion provided on the front side of the predetermined portion of the hammer.

Preferably, the cushion is provided with a recess open upward at a portion corresponding to the predetermined portion of the hammer, and the deformation suppressing portion includes a fitting protrusion formed on the predetermined portion such that the fitting protrusion has a protruding shape protruding downward and is fittable in the recess.

With the construction of this preferred embodiment, while the recess open upward is provided at the portion of the cushion corresponding to the predetermined portion of the hammer, the fitting protrusion fittable in the recess of the cushion is formed on the predetermined portion of the hammer, as the deformation suppressing portion. With this, when the predetermined portion of the hammer contacts the cushion, the fitting protrusion of the hammer is fitted in the recess of the cushion, whereby it is possible to suppress deformation of the cushion in the front-rear direction.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 9A to 9C are views of the first arm and a cushion, in which FIG. 9A shows a state immediately before the first arm moves into contact with the cushion, FIG. 9B shows a state in which the first arm moves into contact with the cushion and has crushed the cushion from above, and FIG. 9C shows a state in which a comparative first arm without a front-side protrusion is in contact with the cushion;

FIGS. 10A and 10B are views useful in explaining a first arm according to a second embodiment, which show a contact portion where the first arm and the cushion contact each other, on an enlarged scale, in which FIG. 10A and FIG. 10B show states similar to the states shown in FIG. 9A and FIG. 9B, respectively; and FIGS. 11A and 11B are views useful in explaining a first arm according to a third embodiment, in which FIG. 11A and FIG. 11B show states similar to the states shown in FIG. 10A and FIG. 10B, respectively.

DETAILED DESCRIPTION OF PREFERRED EMBODIMENTS

Figure 1A:
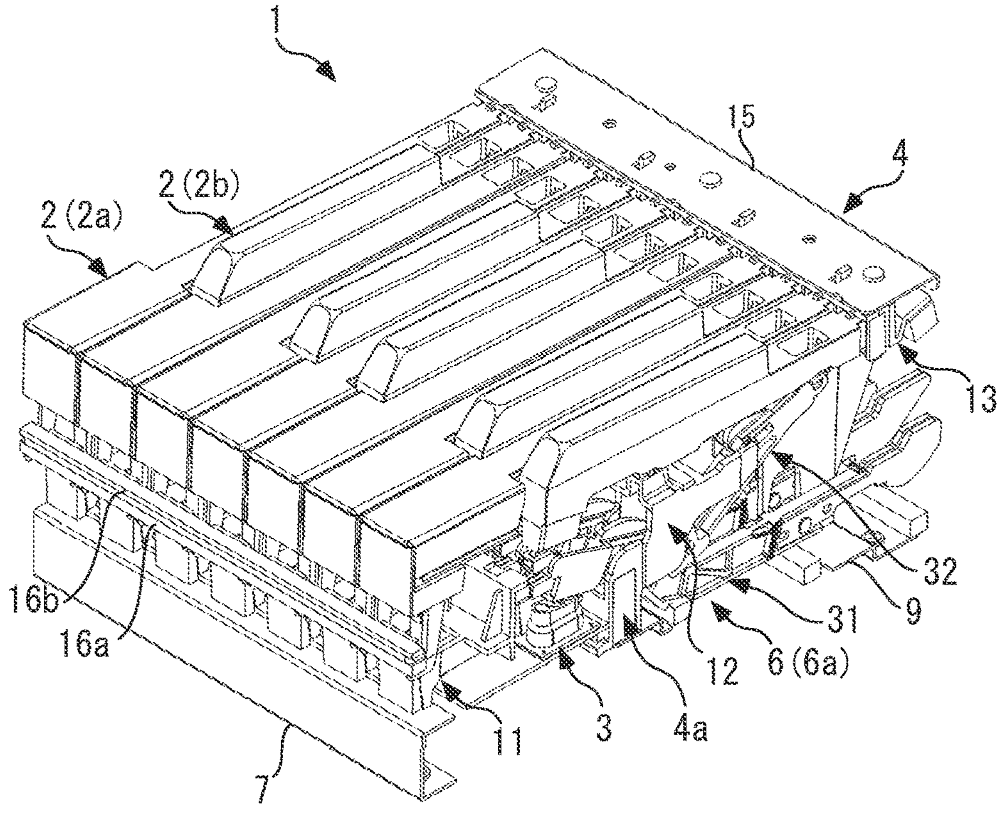

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
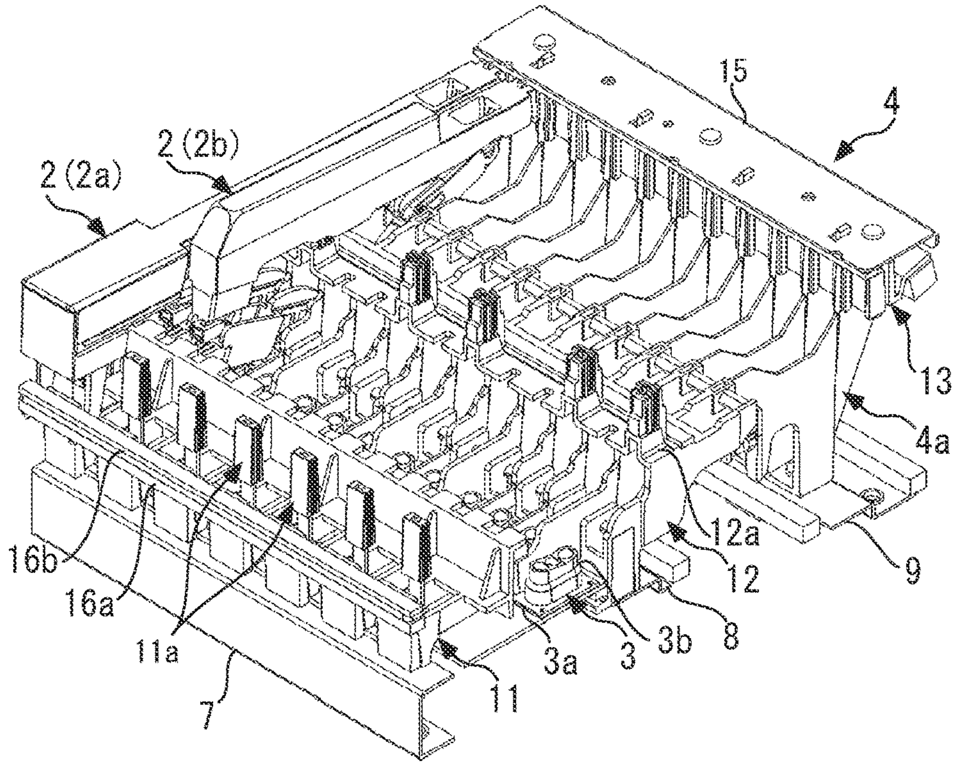
Figure 2:
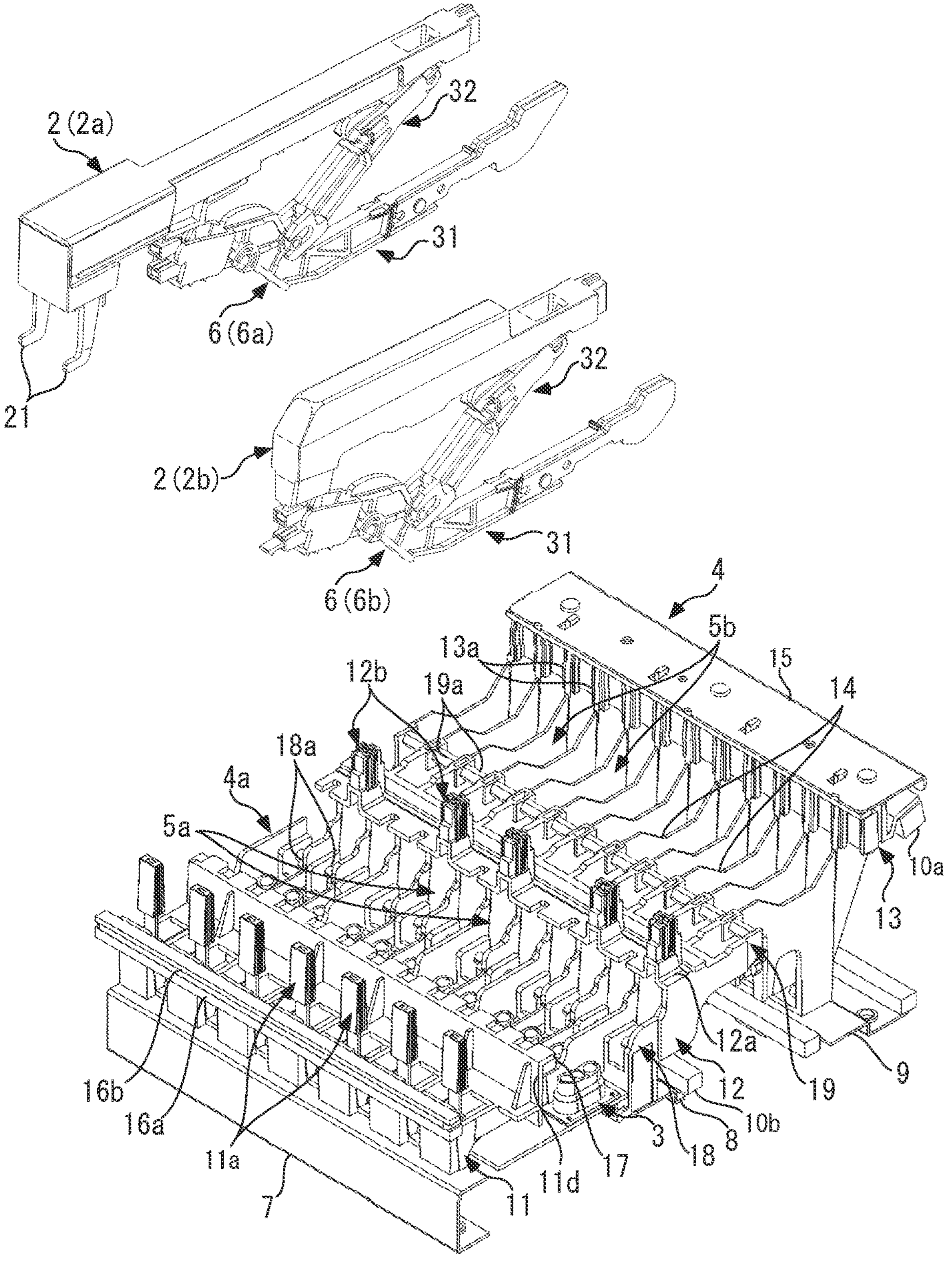
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4, for supporting an associated one of the keys 2 from below, and key switches 3 each for detecting key depression information of an associated one of the keys 2.

Figure 3A:
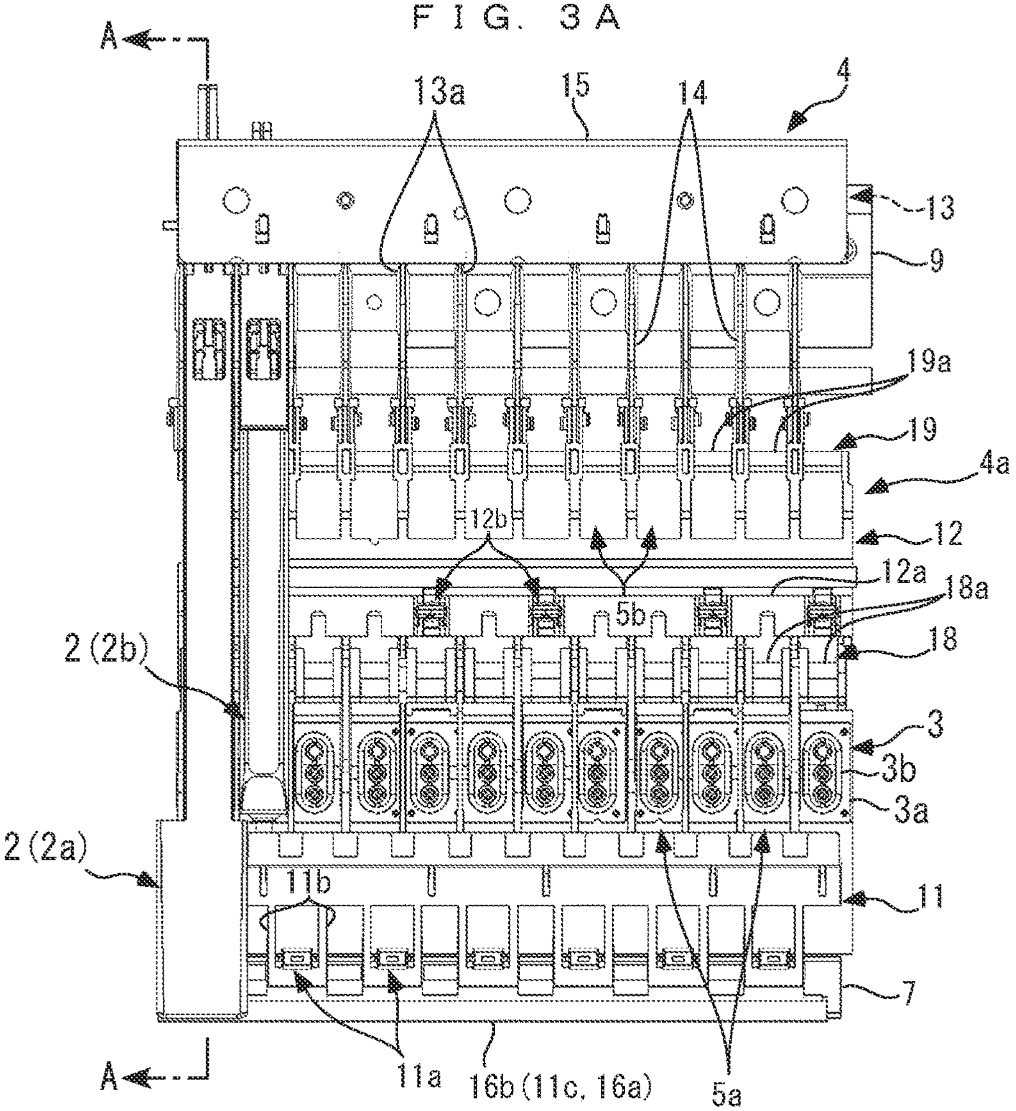
FIG. 3A is a plan view of the keyboard device shown in FIG. 1B
Figure 3B:
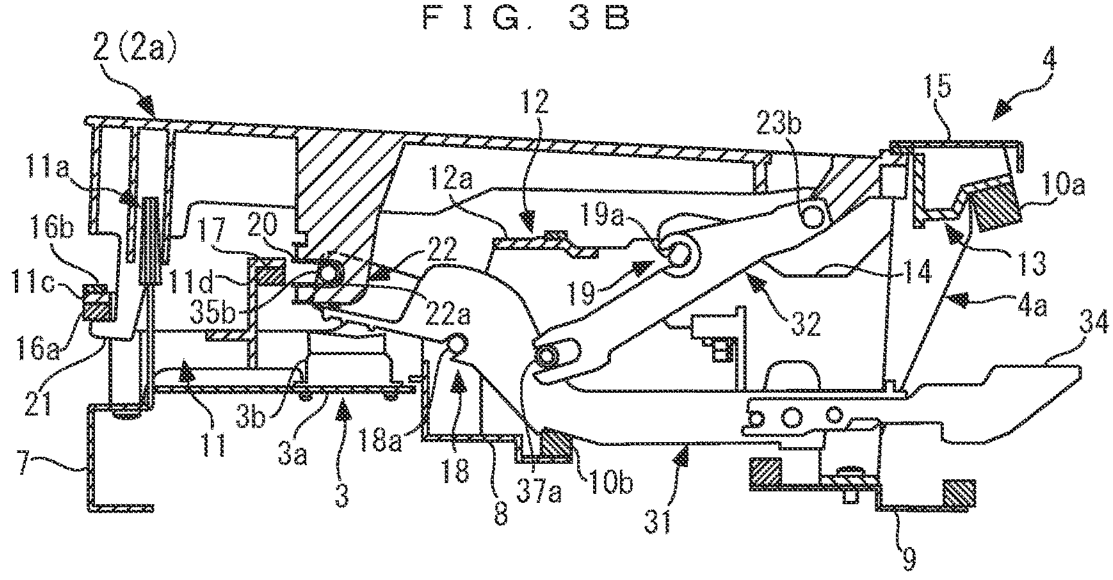
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the above-mentioned first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
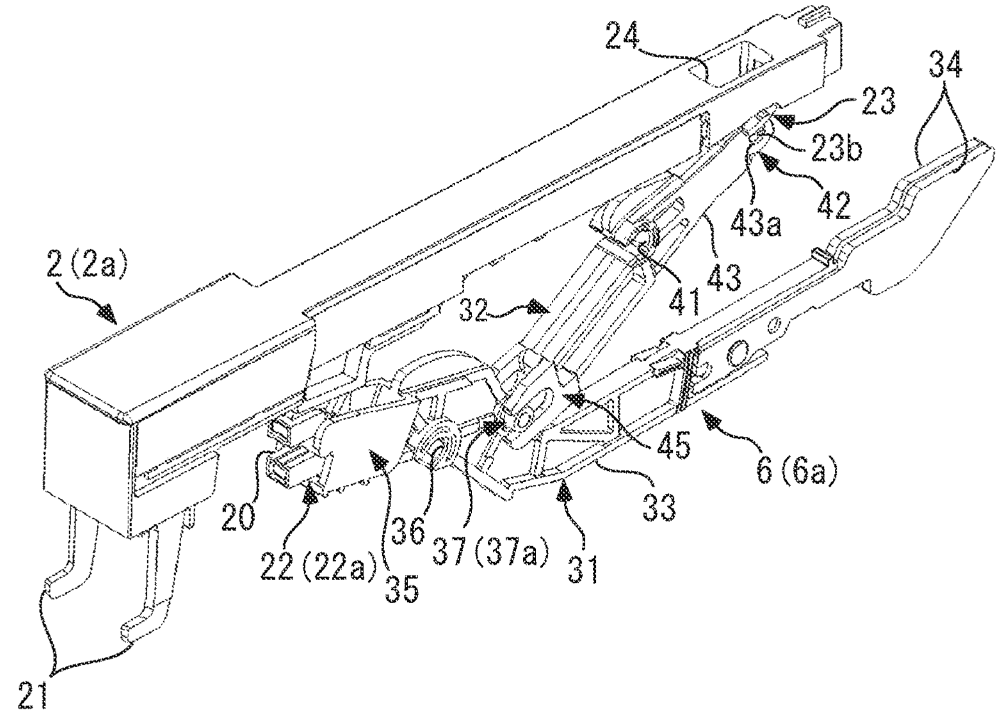
Figure 4B:
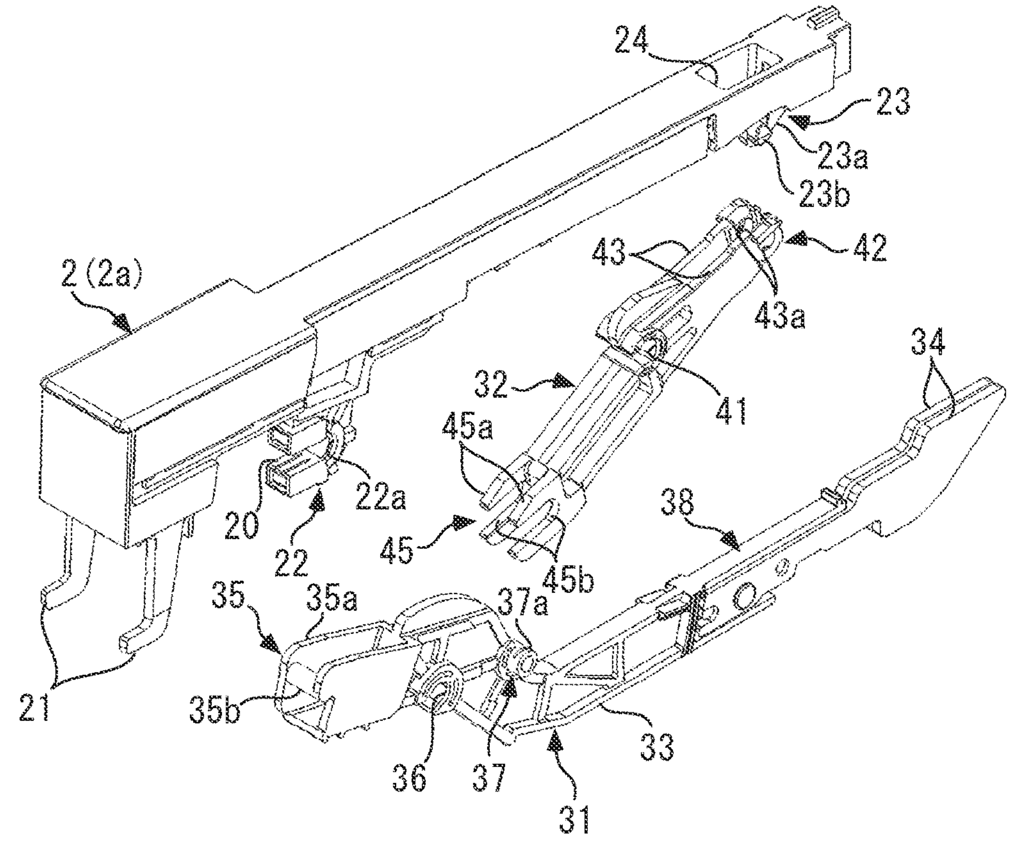

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* formed into a U shape having a slot-like shape in side view and open forward. Further, the connecting recess 22*a* has a cushioning member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, the rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view approximately at a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
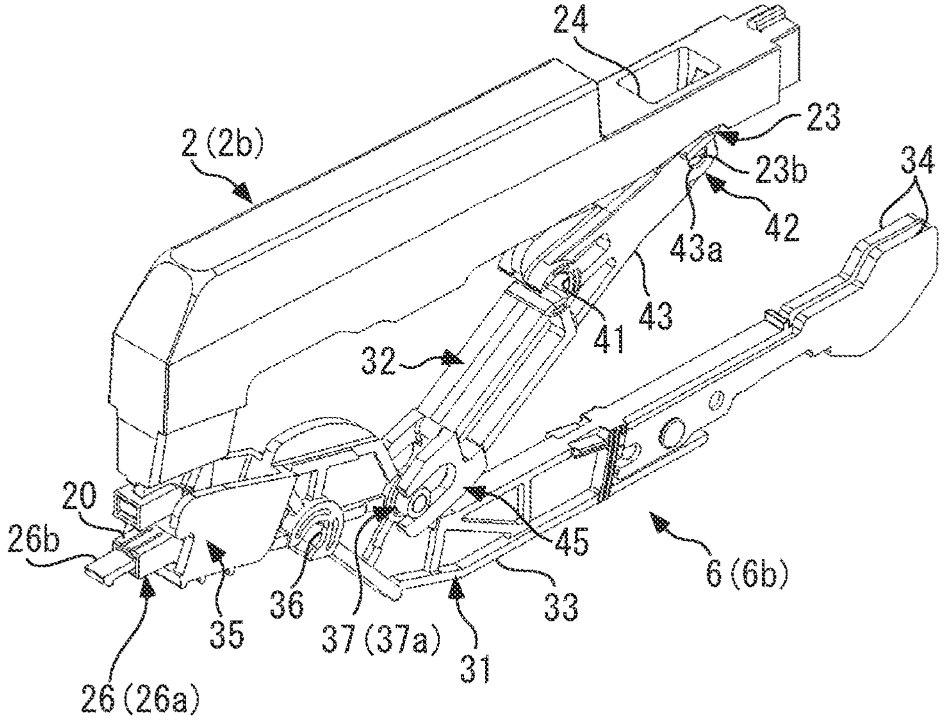
Figure 5B:
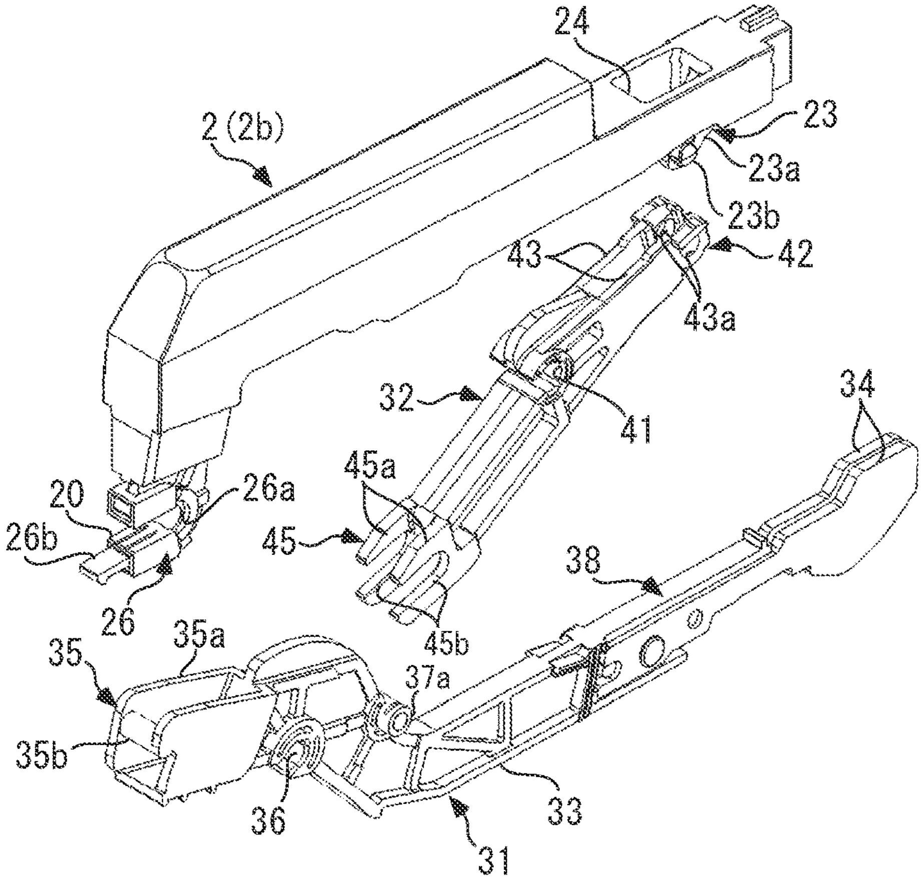

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* formed into a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
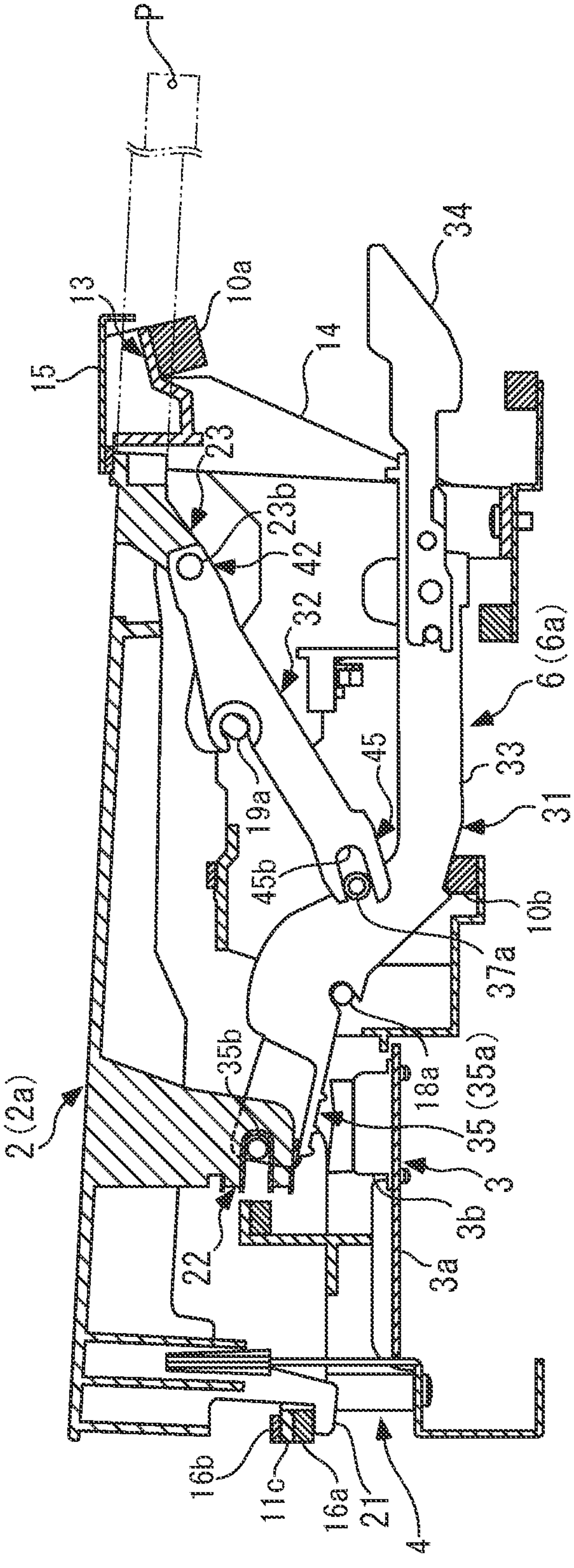
Figure 6B:
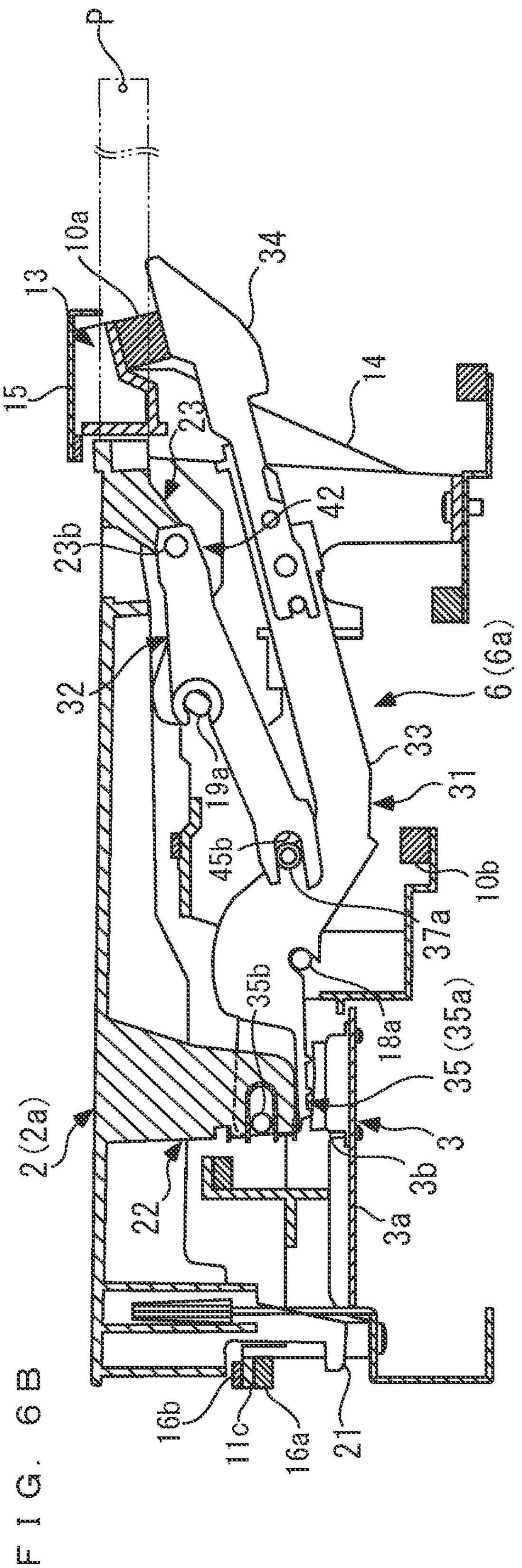
Figure 7A:
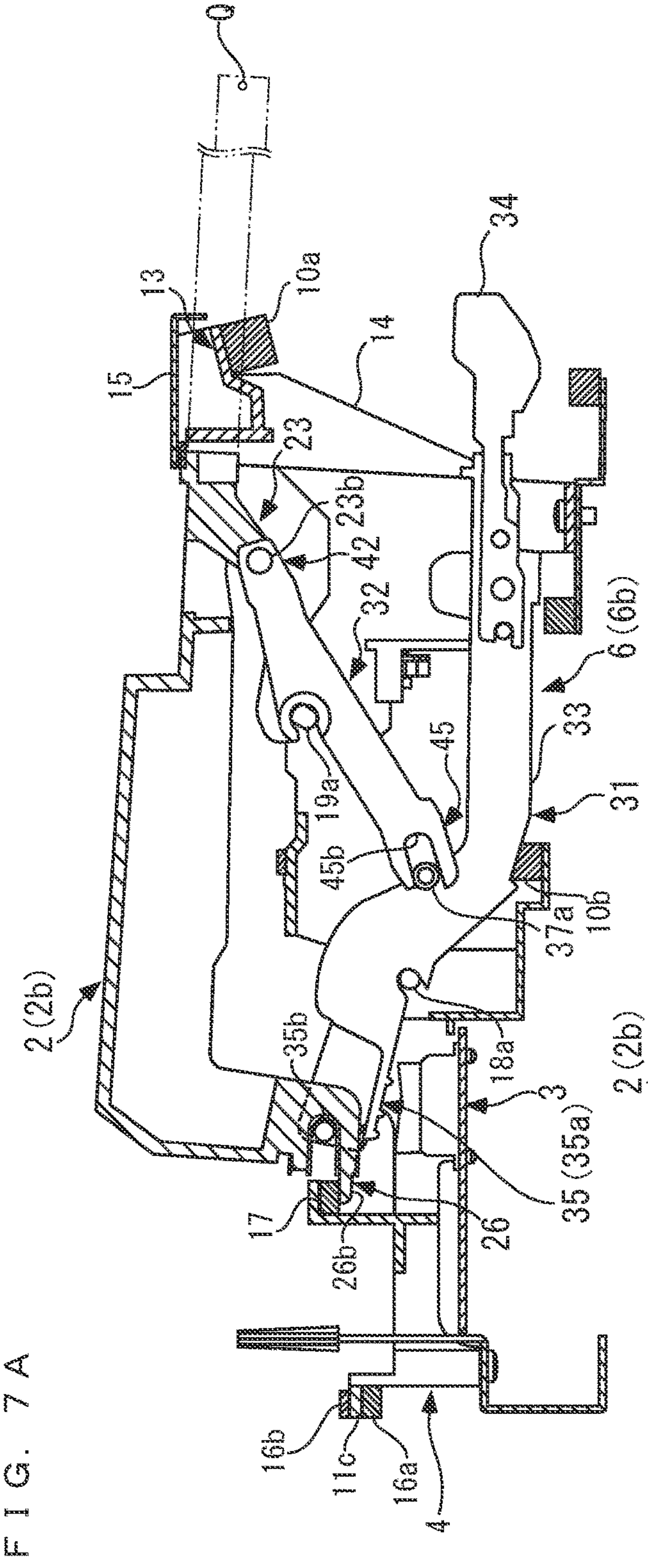
Figure 7B:
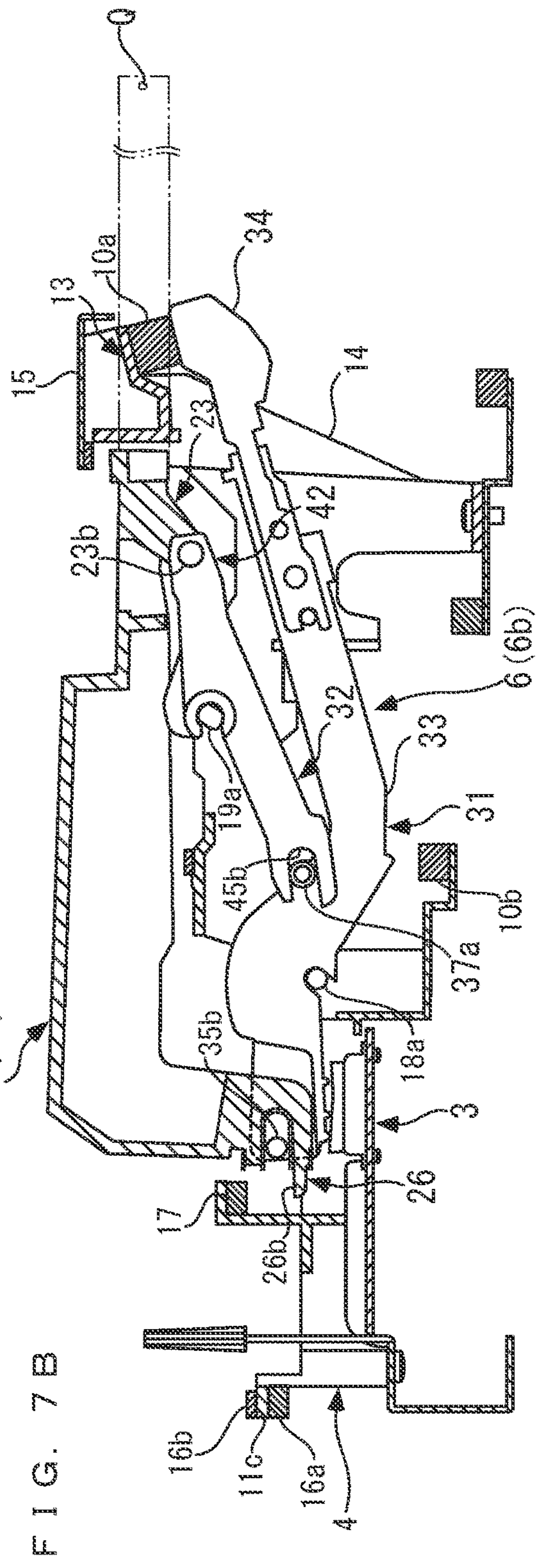

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* is approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, when the black key 2*b* is depressed, operations are performed similar to the above-described operations of the white key 2*a* and the key support mechanism 6*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* is operated such that it is pivotally moved about a virtual pivot Q located rearward of the rear end thereof. Note that similar to the above-mentioned virtual pivot P of the white key 2*a*, the location of the virtual pivot Q is set such that a distance from the front end of the black key 2*b* is approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8 to 11B. The essential part of the present invention is that the first arm 31 (hammer) of each key support mechanism 6 supporting an associated one of the keys 2 from below is provided with a contact portion 33*a* (predetermined portion) formed into a predetermined shape for moving into contact with a cushion 51 associated with the above-mentioned first arm lower limit stopper 10*b* from above, and a deformation suppressing portion is provided on the contact portion 33*a* and its vicinity, for suppressing deformation of the cushion 51 in the front-rear direction.

Figure 8:
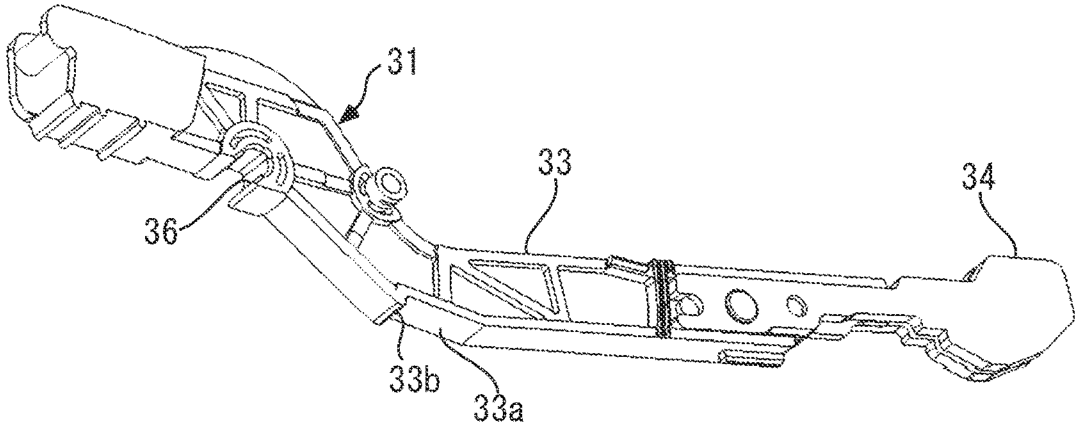
FIG. 8 is a view useful in explaining an essential part of the present invention, which is a perspective view of a first arm according to a first embodiment in a state as viewed from below.

FIG. 8 shows the first arm 31 according to a first embodiment of the present invention. As shown in FIG. 8, the arm body 33 of the first arm 31 is provided with the contact portion 33*a* which moves into contact with the cushion 51 from above, at a predetermined location of a bottom portion thereof, and a front-side protrusion 33*b* (deformation suppressing portion) which protrudes downward, at a location immediately forward (leftward in FIG. 8) of the contact portion 33*a*. The contact portion 33*a* extends a predetermined length in the front-rear direction and is formed flat. Further, the front-side protrusion 33*b* is formed such that it is continuous with a front end of the contact portion 33*a* and protrudes a predetermined length downward at approximately right angles to the contact portion 33*a*.

Figure 9A:
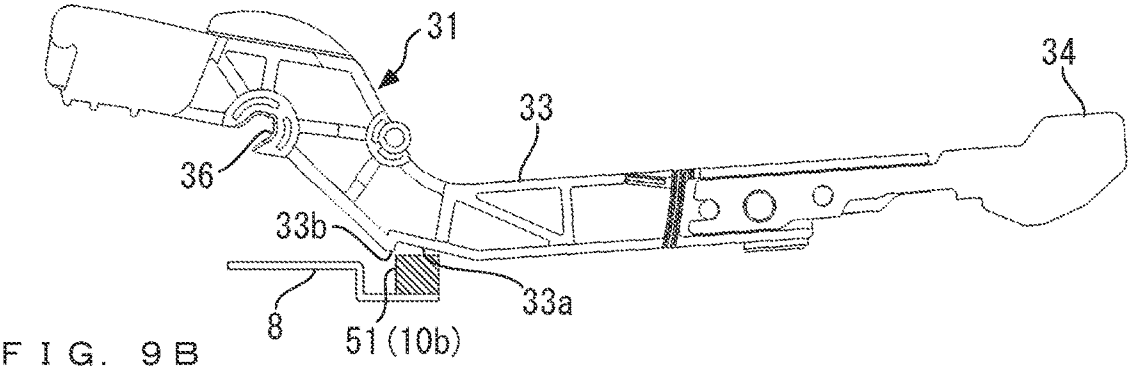

FIG. 9A shows a state immediately before the first arm 31 moves into contact with the cushion 51 attached to the rear end of an upper surface of the middle rail 8 described above, and FIG. 9B shows a state in which the first arm 31 has moved into contact with the cushion 51 and has crushed the cushion 51 from above.

As shown in FIG. 9A, the cushion 51 is formed of an elastic material, such as urethane, and extends a predetermined length along the middle rail 8 in the left-right direction (in a depth direction as viewed in FIG. 9A). The cushion 51 has a predetermined rectangular shape in transverse cross-section over the entire longitudinal length thereof, and an upper surface thereof is horizontal. Further, as shown in FIG. 9A, the contact portion 33*a* of the first arm 31 is formed such that when the contact portion 33*a* contacts the cushion 51, the contact portion 33*a* is inclined downward toward the rear (inclined downward to the right as viewed in FIG. 9A) with respect to the horizontal upper surface of the cushion 51.

Figure 9B:
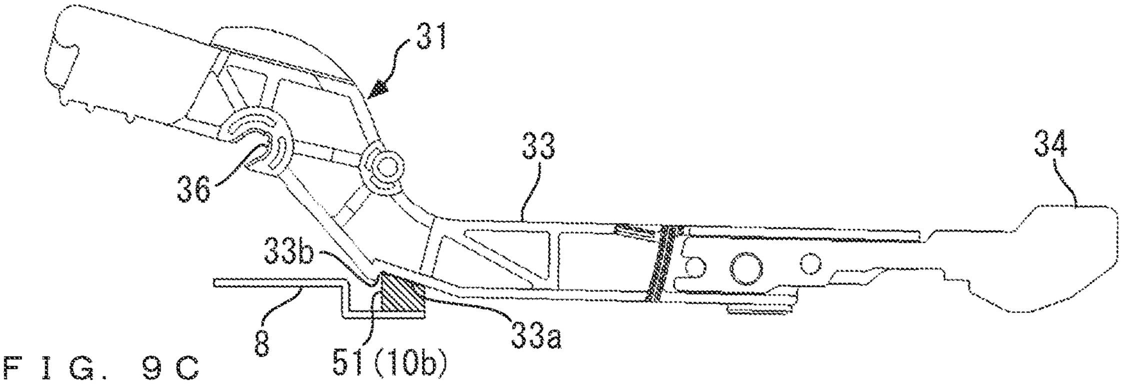
Figure 9C:
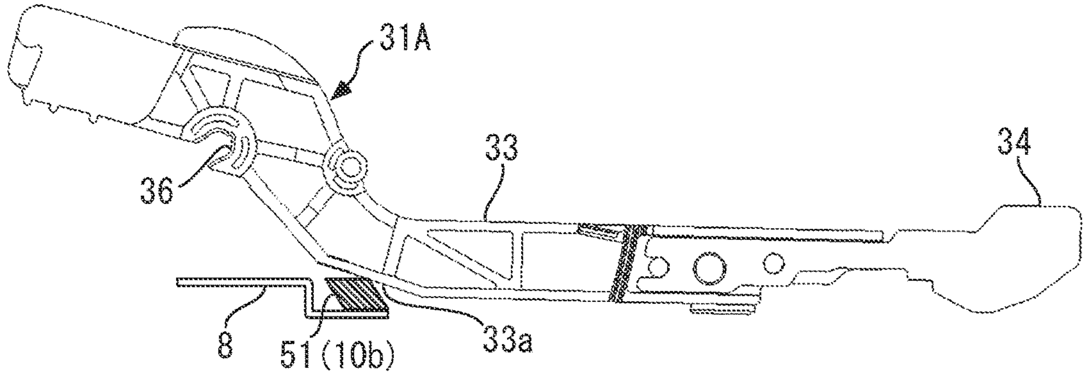

FIG. 9C shows a comparative first arm 31A which is different from the first arm 31 only in that the comparative first arm 31A does not have the front-side protrusion 33*b*, for comparison with the first arm 31. In this comparative first arm 31A, when the contact portion 33*a* contacts the cushion 51 from above, the contact portion 33*a* progressively contacts the cushion 51 from the rear end toward the front end of the cushion 51. In this case, the contact portion 33*a* of the comparative first arm 31A causes not only a downward force but also a force from the rear to the front to act on the cushion 51. Therefore, the cushion 51 is sometimes deformed forward as shown in FIG. 9C, and in this case, there is a fear that the cushion 51 is hindered from properly exerting its function as a cushion.

In contrast, in the case of the first arm 31 according to the present embodiment, since the front-side protrusion 33*b* is provided on the front side of the contact portion 33*a*, when the first arm 31 contacts the cushion 51, the front-side protrusion 33*b* is brought into a state of wrapping around to the front side of the upper end of the cushion 51. With this, as shown in FIG. 9B. when the first arm 31 contacts the cushion 51, it is possible to prevent the cushion 51 from being deformed forward, differently from the above-described comparative first arm 31A. With this, it is possible to cause the cushion 51 to properly exert its function as a cushion.

Further, in the first arm 31 according to the present embodiment, similar to the above-described comparative first arm 31A, the contact portion 33*a* progressively contacts the cushion 51 from the rear end toward the front end of the cushion 51, and hence it is possible to prevent noise from being generated by the contact of the first arm 31 with the cushion 51.

Figure 10A:
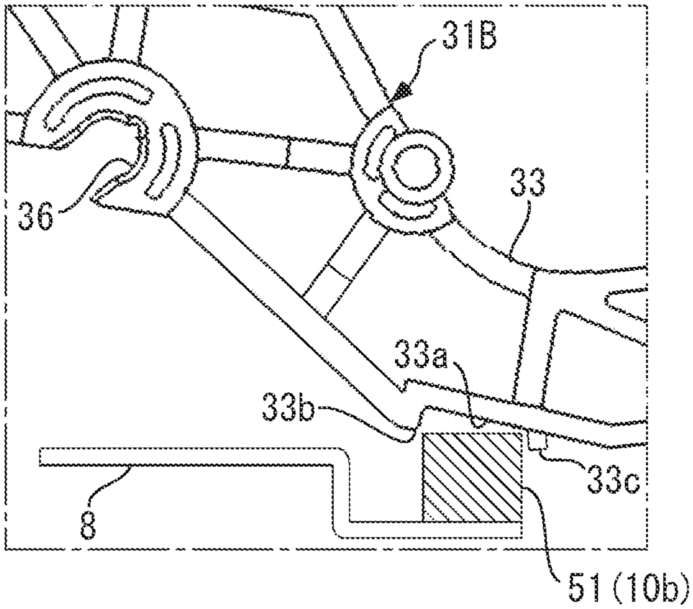
Figure 10B:
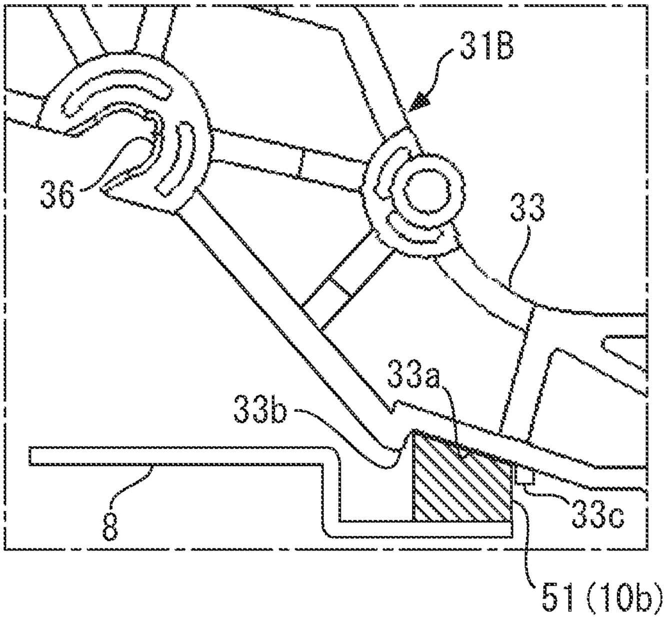

FIGS. 10A and 10B show where a first arm 31B according to a second embodiment of the present invention contacts the cushion 51, on an enlarged scale. As shown in FIG. 10A, the first arm 31B according to the present embodiment is different from the first arm 31 according to the first embodiment only in that the contact portion 33*a* has a rear-side protrusion 33*c* provided at a rear portion thereof. This rear-side protrusion 33*c* protrudes a predetermined length downward, and extends along the entirety of the arm body 33 of the first arm 31B in the left-right direction. Further, the rear-side protrusion 33*c* is set such that when the contact portion 33*a* of the first arm 31B contacts the cushion 51, a distance between the rear-side protrusion 33*c* and the front-side protrusion 33*b* is approximately the same as the length of the upper surface of the cushion 51 in the front-rear direction.

In the first arm 31B constructed as described above, when the contact portion 33*a* thereof contacts the cushion 51, the upper end of the cushion 51 is restrained from the front and the rear by the front-side protrusion 33*b* and the rear-side protrusion 33*c*. With this, when the first arm 31B contacts the cushion 51, it is possible to effectively suppress deformation of the cushion 51 in the front-rear direction, as shown in FIG. 10B.

Figure 11A:
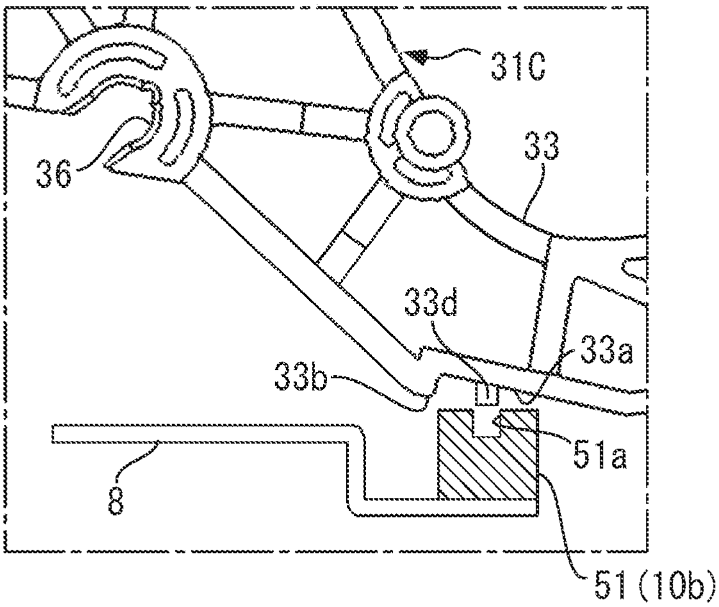
Figure 11B:
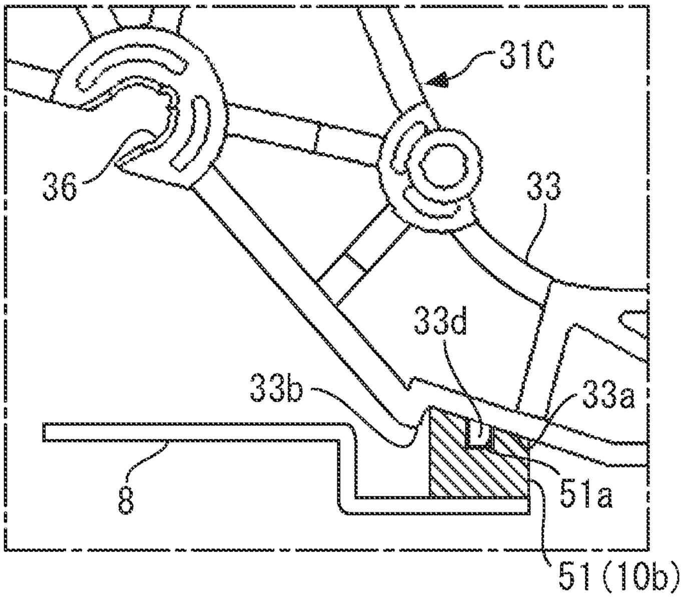

FIGS. 11A and 11B show where a first arm 31C according to a third embodiment of the present invention contacts the cushion 51, on an enlarged scale. As shown in FIG. 11A, the first arm 31C according to the present embodiment is different from the first arm 31 according to the first embodiment only in that the contact portion 33*a* is provided with a fitting protrusion 33*d*. The fitting protrusion 33*d* is formed at a location spaced rearward from the front-side protrusion 33*b* by a predetermined distance. The fitting protrusion 33*d* protrudes a predetermined length downward, and extends along the entirety of the arm body 33 of the first arm 31C in the left-right direction. Further, approximately at a center of the cushion 51 in the front-rear direction, a recess 51*a* is provided which is formed to open upward with a depth approximately equal to the protruding length of the above-described fitting protrusion 33*d* such that the recess 51*a* extends along the longitudinal direction of the cushion 51.

In the first arm 31C constructed as described above, when the contact portion 33*a* thereof contacts the cushion 51, the fitting protrusion 33*d* of the first arm 31C is inserted into the recess 51*a* of the cushion 51 from above. With this, the first arm 31C contacts the cushion 51, it is possible to prevent the cushion 51 from being deformed in the front-rear direction, as shown in FIG. 11B.

Note that the present invention is not limited to the above-described embodiments, but it can be practiced in various forms. For example, although in the first embodiment, the front-side protrusion 33*b* for preventing the cushion 51 from being deformed forward is provided on the front side of the contact portion 33*a* of the first arm 31, for example, in a case where the contact portion 33*a* of the first arm 31 is formed such that it is inclined downward toward the front, to prevent the cushion 51 from being deformed rearward when the contact portion 33*a* of the first arm 31 contacts the cushion, it is preferable that an equivalent of the front-side protrusion 33*b* is provided rearward of the contact portion 33*a*.

Further, although in the third embodiment, the fitting protrusion 33*d* is provided on the contact portion 33*a* of the first arm 31 according to the first embodiment, it is also possible to omit the front-side protrusion 33*b*. Even in the first arm thus constructed, similar to the other first arms, it is possible to prevent the cushion 51 from being deformed in the front-rear direction when the first arm 31 contacts the cushion 51.

Furthermore, although in the above-described embodiments, the description is given of a case where the present invention is applied to the keyboard device 1 in which the keys 2 depressed operate such that they pivotally move about the virtual pivots P and Q located rearward of the rear ends of the keys 2, respectively, the present invention is not limited to this, but as a matter of course, the present invention can be applied to a general keyboard device in which keys are pivotally moved about the rear ends of their own, respectively, and each of which is not provided with the second arm 32. Further, details of the constructions of the contact portion 33*a*, the front-side protrusion 33*b*, the rear-side protrusion 33*c*, and the fitting protrusion 33*d* of the first arms 31, 31B and 31C shown in the embodiments are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A keyboard device for a keyboard instrument, comprising:

a keyboard chassis;

a key extending in a front-rear direction and disposed on the keyboard chassis;

a hammer extending in the front-rear direction and being pivotally supported, below the key, on the keyboard chassis, via a hammer support shaft, the hammer being vertically pivotally moved in a manner interlocked with the key which has been depressed; and a cushion provided below the hammer and having a predetermined portion of the hammer placed thereon in a key-released state, the predetermined portion of the hammer contacting the cushion from above when the hammer having been pivotally moved upward in accordance with depression of the key returns to an original position in accordance with release of the key, wherein the hammer has a deformation suppressing portion provided on the predetermined portion and/or its vicinity, for suppressing deformation of the cushion in the front-rear direction when the hammer contacts the cushion, wherein the predetermined portion of the hammer is formed such that the predetermined portion is inclined downward toward a rear with respect to an upper surface of the cushion when the predetermined portion contacts the cushion, wherein the deformation suppressing portion includes a downwardly protruding front-side protrusion on a front side of the predetermined portion, the front-side protrusion being brought into a state of wrapping around to a front side of the cushion when the predetermined portion contacts the cushion, and wherein the front-side protrusion is configured to block further forward movement of a front surface of the cushion by the front surface of the cushion abutting against the front-side protrusion from a rear side when the predetermined portion contacts the cushion.

2. The keyboard device according to claim 1, wherein the deformation suppressing portion further includes a downwardly protruding rear-side protrusion on a rear side of the predetermined portion.

3. The keyboard device according to claim 1, wherein the cushion is provided with a recess open upward at a portion corresponding to the predetermined portion of the hammer, wherein the deformation suppressing portion includes a fitting protrusion formed on the predetermined portion such that the fitting protrusion has a protruding shape protruding downward and is fittable in the recess, and wherein the fitting protrusion is configured to be inserted into the recess when the predetermined portion contacts the cushion.

* * * * *